United States Patent
Hallen

(10) Patent No.: US 12,458,465 B2
(45) Date of Patent: Nov. 4, 2025

(54) TAILORED LIGHT WINDOW TECHNIQUE FOR EYE SURGERY

(71) Applicant: Alcon Inc., Fribourg (CH)

(72) Inventor: Paul R. Hallen, Colleyville, TX (US)

(73) Assignee: Alcon Inc., Fribourg (CH)

( * ) Notice: Subject to any disclaimer, the term of this patent is extended or adjusted under 35 U.S.C. 154(b) by 949 days.

(21) Appl. No.: 17/649,600

(22) Filed: Feb. 1, 2022

(65) Prior Publication Data

US 2022/0249191 A1    Aug. 11, 2022

Related U.S. Application Data

(60) Provisional application No. 63/146,066, filed on Feb. 5, 2021.

(51) Int. Cl.
| | |
|---|---|
| *A61B 90/30* | (2016.01) |
| *A61B 17/34* | (2006.01) |
| *A61F 9/007* | (2006.01) |

(52) U.S. Cl.
CPC .......... *A61B 90/30* (2016.02); *A61B 17/3421* (2013.01); *A61F 9/007* (2013.01)

(58) Field of Classification Search
CPC ................ A61B 17/0231; A61B 17/02; A61B 17/3421–3423; A61B 3/0008; A61B 2090/304; A61B 90/30
See application file for complete search history.

(56) References Cited

U.S. PATENT DOCUMENTS

| | | |
|---|---|---|
| 5,249,121 A | 9/1993 | Baum |
| 6,011,647 A | 1/2000 | Geschwentner |
| 7,321,385 B2 | 1/2008 | Rus et al. |
| 9,185,776 B2 | 11/2015 | Ahern |
| 10,016,248 B2 | 7/2018 | Mirsepassi |
| 10,499,974 B2 | 12/2019 | Heim et al. |
| 10,758,419 B2 | 9/2020 | Mirsepassi et al. |
| 10,828,124 B2 | 11/2020 | Geerlings et al. |
| 10,881,286 B2 | 1/2021 | Tesar et al. |
| 11,285,043 B2 | 3/2022 | Tripathi |
| 2002/0087149 A1 | 7/2002 | Mccary |
| 2008/0246920 A1* | 10/2008 | Buczek ............... A61B 1/0655 351/221 |
| 2010/0198200 A1 | 8/2010 | Horvath |
| 2011/0112377 A1 | 5/2011 | Papac |
| 2012/0014161 A1 | 1/2012 | Pickett et al. |

(Continued)

FOREIGN PATENT DOCUMENTS

WO    2020084611 A1    4/2020

*Primary Examiner* — Eduardo C Robert
*Assistant Examiner* — Michelle C Green

(57) ABSTRACT

A technique for illuminating an end of a surgical tool near a front of an eye. The technique avoids increased illumination of an operating room and challenges to the surgeon associated with such increased illuminating. Instead, a tailored window of light may be directed at the end of the surgical tool that is to be guided into the eye. This tailored window of light is of such minimal illumination or narrow monochromatic light that visual enhancement is provided without a resultant constriction to the surgeon's own eyes. Further, a cannula for receiving the end of the surgical instrument may also be visually enhanced with similar fluorescent light.

20 Claims, 5 Drawing Sheets

(56) References Cited

U.S. PATENT DOCUMENTS

| | | | |
|---|---|---|---|
| 2012/0041461 A1* | 2/2012 | McCollam | A61B 90/30 606/170 |
| 2012/0191078 A1 | 7/2012 | Yadlowsky | |
| 2015/0148615 A1 | 5/2015 | Brennan | |
| 2017/0238962 A1 | 8/2017 | Hansen et al. | |
| 2017/0252121 A1* | 9/2017 | Diao | B29C 65/14 |
| 2018/0140179 A1* | 5/2018 | LaBelle | A61F 9/007 |
| 2018/0168861 A1 | 6/2018 | Mirsepassi | |
| 2019/0046288 A1 | 2/2019 | Anderson | |
| 2019/0183680 A1* | 6/2019 | Abt | A61F 9/00736 |
| 2019/0216645 A1 | 7/2019 | Klufas et al. | |
| 2019/0239979 A1* | 8/2019 | Abt | A61B 17/3421 |
| 2019/0388271 A1* | 12/2019 | Abt | A61B 3/14 |
| 2020/0022773 A1* | 1/2020 | Grueebler | A61B 90/30 |

\* cited by examiner

TAILORED LIGHT WINDOW TECHNIQUE FOR EYE SURGERY

PRIORITY CLAIM

This application claims the benefit of priority of U.S. Provisional Patent Application Ser. No. 63/146,066 titled "TAILORED LIGHT WINDOW TECHNIQUE FOR EYE SURGERY," filed on Feb. 5, 2021, whose inventor is Paul R. Hallen, which is hereby incorporated by reference in its entirety as though fully and completely set forth herein.

DESCRIPTION OF THE RELATED ART

Over the years, many dramatic advancements in the field of eye surgery have taken place. However, regardless of the particular procedure, a few different types of tools are generally employed. For example, an interventional tool that is tasked with directly engaging with and affecting a part of the eye will be utilized. A common example of such a tool is a vitrectomy probe utilized in a vitrectomy. A vitrectomy is the removal of some or all of the vitreous humor from a patient's eye. In some cases, where the surgery was limited to removal of clouded vitreous humor, the vitrectomy may constitute the majority of the procedure. However, a vitrectomy may accompany cataract surgery, surgery to repair a retina, to address a macular pucker or a host of other issues.

The vitreous humor itself is a clear fibrous gel that may be removed by an elongated probe when inserted through a pre-placed cannula at the eye. More specifically, the probe includes a central channel for removal of the vitreous humor. Further, the cannula provides a structurally supportive conduit strategically located at an offset location at the front of the eye, such as the pars plana. In this way, the probe may be guidingly inserted into the eye in a manner that avoids damage to the patient's lens or cornea.

Of course, in order to achieve a successful vitrectomy or other such intervention, some additional tools may be required. For example, visualization of the vitrectomy may be aided by the insertion of a light instrument. Similar to the vitrectomy probe, this may be guided by another pre-placed cannula that is again positioned at an offset location. Thus, a given eye surgery is likely to have multiple tools that reach interventionally into the eye.

One issue that emerges in advancing surgical tools through pre-placed cannulas as described, is visibility. Of course, utilizing a well-lit room to make sure that the surgeon can safely see both the cannula and the end of the tool that is being advanced into the cannula is an option. However, there are competing locations of interest for visibility. That is, competing locations of visibility may be involved in the surgery. For example, the retina within and at the back of the eye is often the target location for the eye surgery. However, if the operating room is too bright, there may not be sufficient contrast for good visibility of the retina to the surgeon.

As an alternative to the idea of a well-lit room, the room may be kept relatively dim while the surgeon utilizes a microscope light positioned over the patient's eye to illuminate the cannula and the end of the tool. In this way, as the end of the tool approaches the cannula, visibility of both may be sufficient to ensure safe advancement of the tool end into the cannula. Once this occurs, the surgeon may turn off or dim the microscope light to more closely match the illumination within the room. In theory, this may restore sufficient contrast to allow the surgeon to better see features within the eye such as the noted retina.

Because the surgeon's visibility may be dependent upon the surgeon's eyes which are themselves affected by fairly substantial changes in degrees of illumination, turning lights on and off, whether throughout the room or at a microscope light, may affect the surgeon's vision. Even the non-surgeon understands that when a bright light is turned down or off, it takes a few moments for visibility to return to a normal level as the eyes adjust to the change. In the case of the described eye surgeries, this means that once the surgeon threads the end of the surgical tool into the cannula, the intense light is turned down and focus is then shifted to the interior of the eye to perform a procedure. However, due to the change in light conditions, the surgeon's vision may need to adjust to the change prior to continuing the surgery (which may cause some delay).

SUMMARY

A method of performing eye surgery. The method includes securing a fluorescent cannula at an eye surface. Low intensity light may be maintained within the operating room as an interventional device is advanced toward the fluorescent cannula. However, another light is directed at the device that is not the low intensity light. Rather, this other light is of a tailored light window range. The tailored light may be light that is between about 5% and about 30% illumination and/or light that is substantially monochromatic and less than about 3,000 nm (nanometers) in wavelength.

DETAILED DESCRIPTION

In the following description, numerous details are set forth to provide an understanding of the present disclosure. However, it will be understood by those skilled in the art that the embodiments described may be practiced without these particular details. Further, numerous variations or modifications may be employed which remain contemplated by the embodiments as specifically described.

Embodiments are described with reference to certain types of vitrectomy probe surgical procedures. In particular, a procedure in which vitreous humor is removed to address vitreous hemorrhage is illustrated. However, tools and techniques detailed herein may be employed in a variety of other manners. For example, embodiments of a vitrectomy probe as detailed herein may be utilized to address retinal detachments, macular pucker, macular holes, vitreous floaters, diabetic retinopathy or a variety of other eye conditions. Regardless, so long as the surgical procedure is aided by the use of a tailored light window directed at the end of a surgical instrument as it is guided into the eye, appreciable benefit may be realized.

Figure 1:
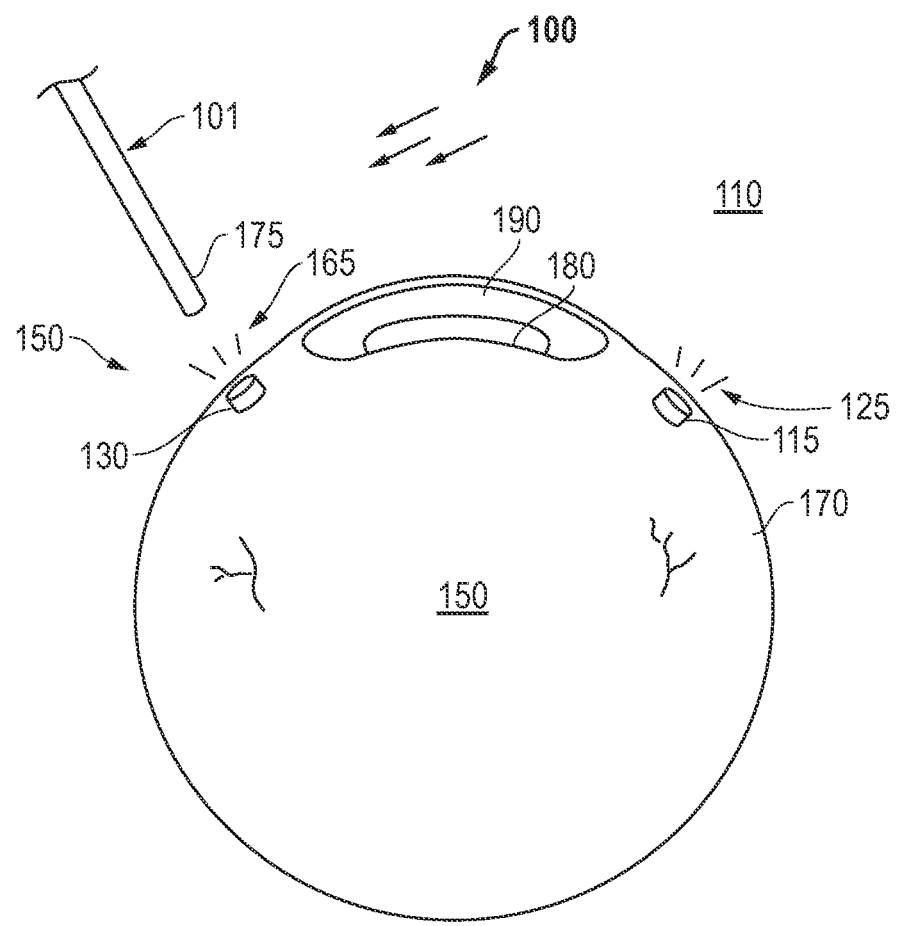
FIG. 1 is an illustration of a surgical tool approaching a preplaced fluorescent cannula at an eye for surgery therein.

Referring now to FIG. 1, an illustration of a surgical tool 101 approaching a preplaced fluorescent cannula 130 at an eye 150 is shown. The tool 101 may be a vitrectomy probe with a needle 175 wherein the objective is to guidingly insert the needle 175 through the cannula 130 for a vitrectomy procedure within the eye 150. Notice that the procedure is taking place within the environment of an operating room 110 where generally low illumination ambient light, perhaps under about 2 lumen, is present. This is generally a non-light assisted environment where the visualization and contrasting aid techniques for the procedure are carried out as detailed further below. More specifically, in the embodiment illustrated in FIG. 1, prior to reaching the interior of the eye 150, a tailored window of light 100 may be used as a visualization aid for guiding the end of the needle 175 implement into the cannula 130.

The tailored window of light 100 being directed at the needle 175 as a visualization aid is a beneficial in a variety of ways. For example, the low illumination of the operating room 110, which is beneficial for surgery within the eye 150, as described below, does not need to be altered. There is no need to operate a dimmer or a foot pedal or anything else to brighten the room 110, followed by another attempt at re-finding the proper low level of illumination for the actual surgery within the eye. Instead, that general low level of illumination throughout the room 110 may be maintained because a different tailored light 100 is utilized as a visual aid for threading the needle 175 into the cannula 130. Furthermore, because the overall intensity of light in the room 110 was not raised, the surgeon's own eyes may not need to undergo a period of constricted iris adjustment back open to the lower level illumination in the room 110 before proceeding with the surgery in the eye 150. This is particularly beneficial because it may avoid a period of time where the surgeon attempts to hold still (possibly holding an implement inside the eye 150) while the surgeon waits for his/her own visually impaired eyes to adjust back to the dimmer light of the room 110.

Continuing with reference to FIG. 1, the tailored light 100 itself may also be of a particular window of wavelengths. For example, the light 100 may be of between about 5% and about 30% illumination of a spectral output that is up to 10 lumens (other levels are also contemplated (e.g., 20 lumens, 50 lumens, 100 lumens, etc.) Just like avoiding brightening the light of the room 110 generally, limiting the illumination of the tailored light 100 to a narrow low level may avoid introducing a period of adjustment for the surgeon's own eyes as described above. Further, in another embodiment, the light 100 may alternately or additionally of a substantially monochromatic nature such as "amber" light. From a quantifiable standpoint, this may include substantially monochromatic light that is less than about 3,000 nm in wavelength. By way of more specific examples, this could include amber light of between 570-620 nm, near infrared (IR) of between about 800 and 2,500 nm and IR of up to 1,000 nm. Other wavelengths can also be used as required by the specific surgical needs.

Figure 3:
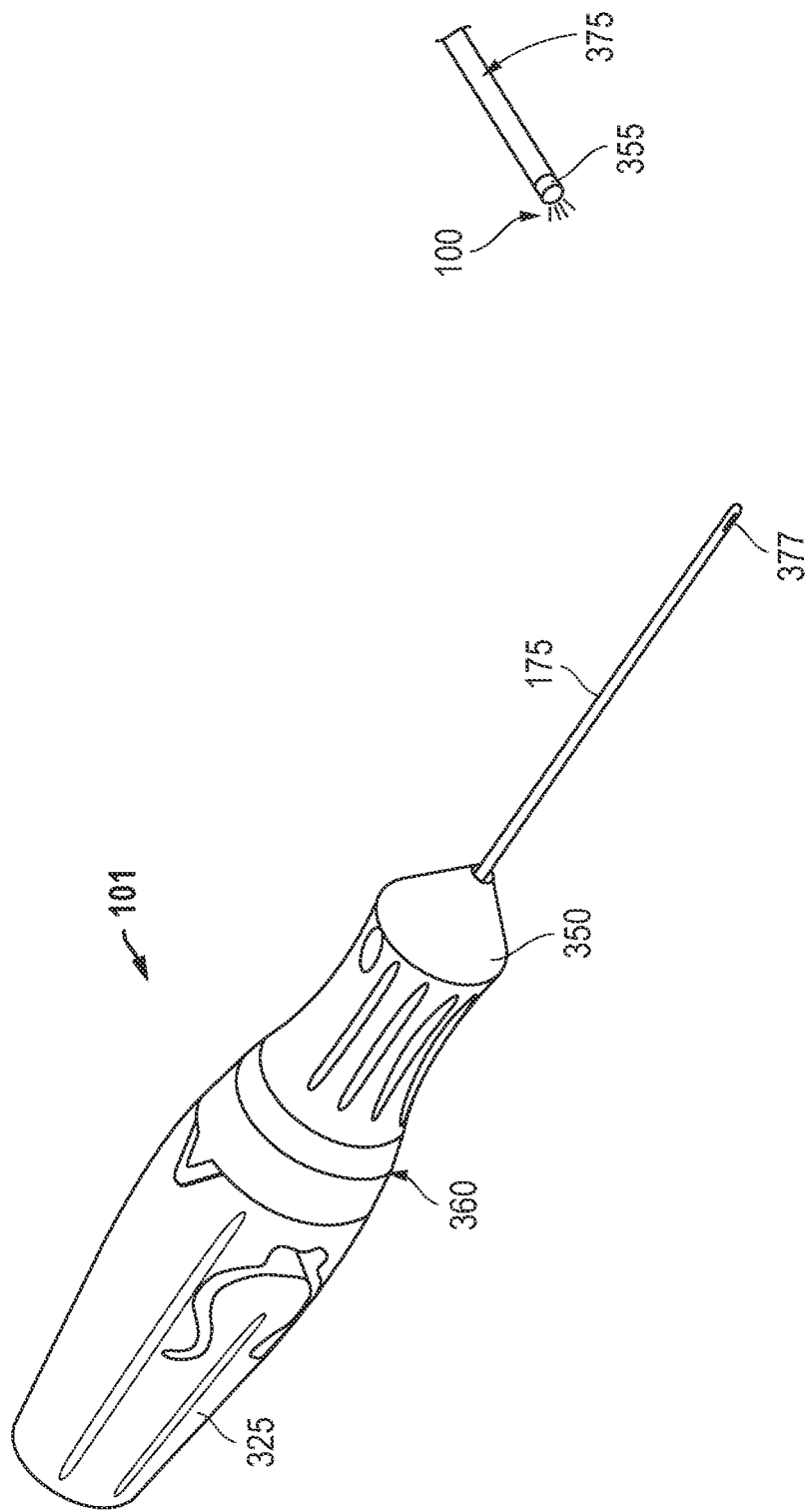
FIG. 3 is a perspective view of the surgical tool of FIG. 1 in the form of a vitrectomy probe with a light instrument directing a tailored window of light thereat.
Figure 4:
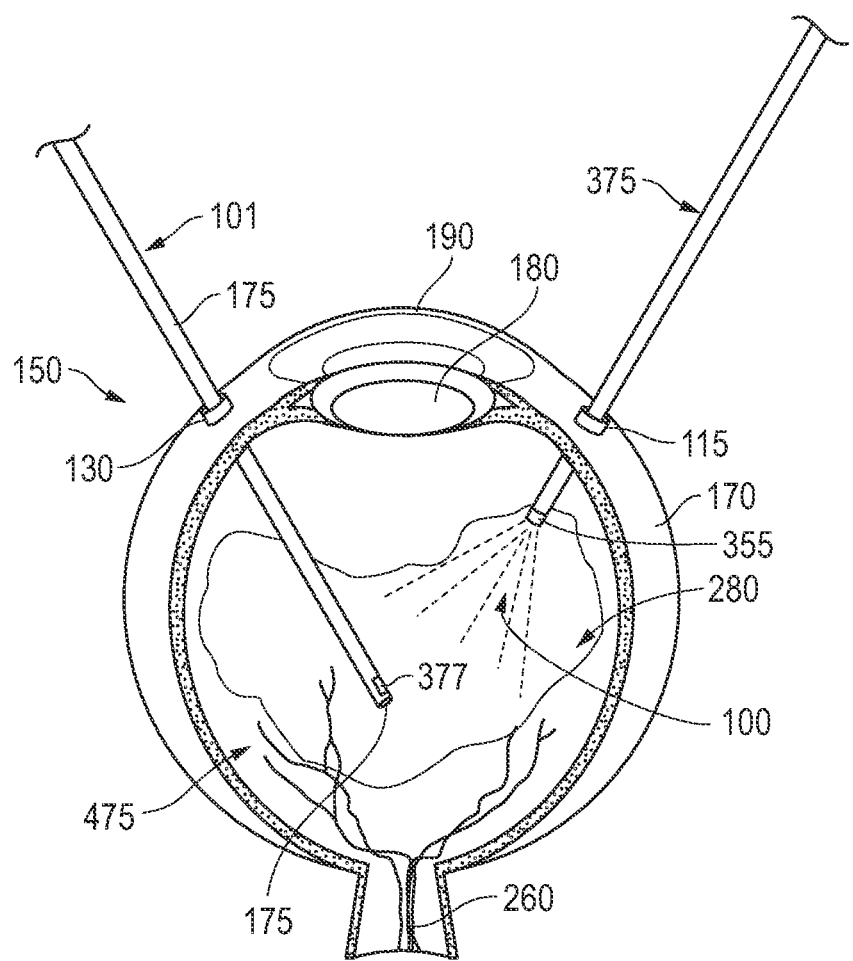
FIG. 4 is a perspective overview of the tool and light instrument of FIG. 3 advanced to within the eye of FIGS. 1 and 2 for a surgical procedure therein.

With added reference to FIG. 3, in one embodiment, the tailored light 100 is introduced by the surgeon's use of a light instrument 375 such as a conventional chandelier as illustrated in FIG. 3. This may be particularly beneficial where such an instrument 375 is already slated to be utilized in the procedure within the eye 150. Indeed, note that there are multiple pre-placed cannulas 130, 115 at offset locations of the sclera 170, avoiding more delicate lens 180 and cornea 190 structure. Thus, as illustrated in FIG. 4, a procedure within the eye 150 may eventually be carried out by both instruments 101, 375.

Notice that in addition to the tailored light 100 directed at the end of the needle 175, there is additional light 125 emitting from the cannulas 130, 115. This additional light may be fluorescent light emanating from phosphor of the cannula structure. That is, in the embodiment shown, the cannulas 130, 115 may be comprised of a conventional polycarbonate material with phosphorescent pigment mixed therein. Both the polycarbonate and pigment would be conventional biocompatible materials. In one embodiment, the pigment selected is based on strontium oxide aluminate chemistry. One advantage of utilizing phosphorescence to supply the light emitting component is the resulting "glow" or "glow-in-the-dark" nature supplied to the cannulas 130, 115. Thus, from the surgeon's perspective, the cannulas 130, 115 will be visibly discrete while at the same time, the end of the needle 175 will be illuminated by a tailored light 100. Therefore, the structures which are being brought together and mated are both suitably lit and visible within the otherwise dim light of the room 110. It will be appreciated that other self-illuminating cannula types are also contemplated.

Figure 2:
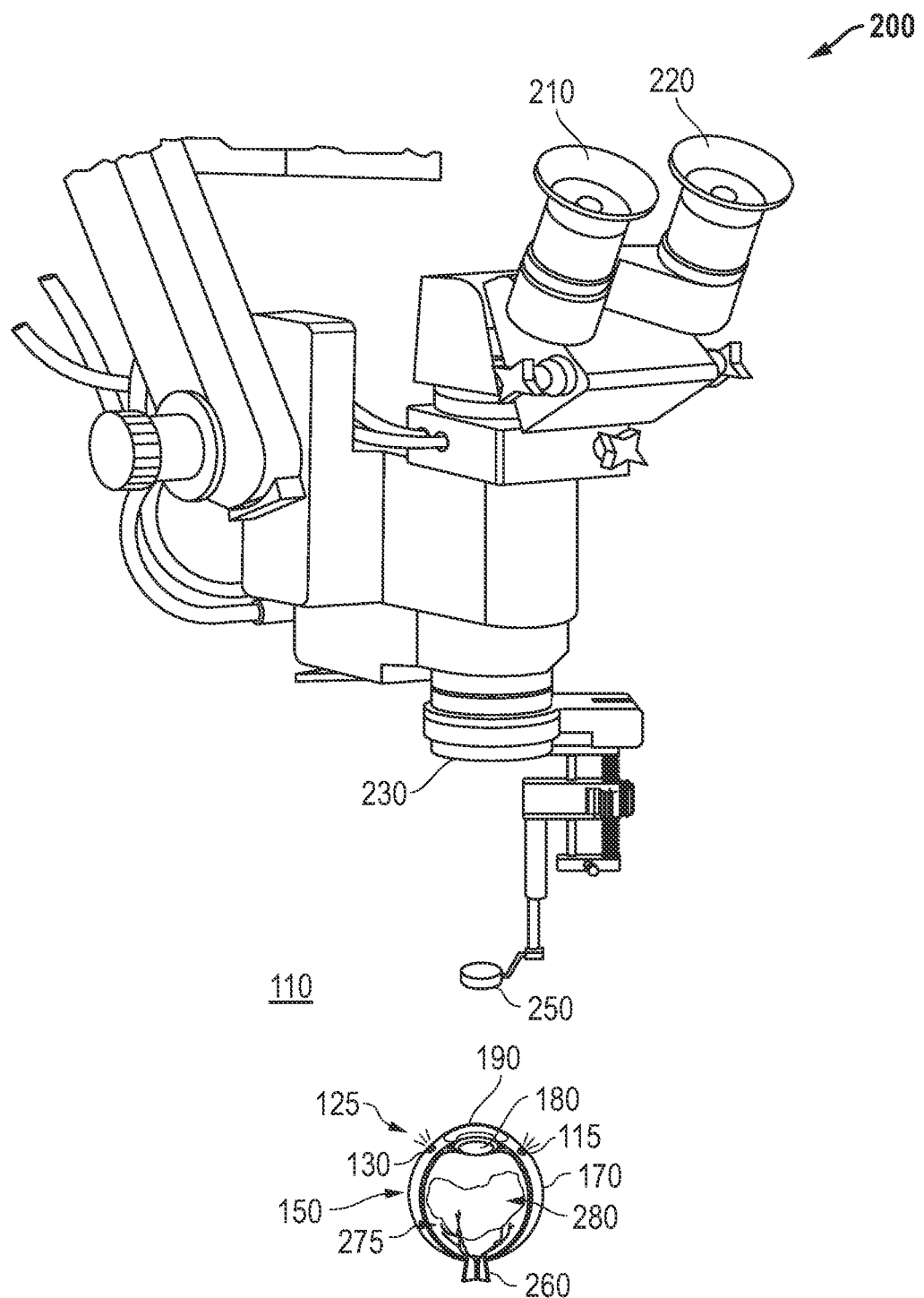
FIG. 2 is an overview of the eye of FIG. 1 in the environment of an operating room positioned below a microscope for the surgery.

Referring now to FIG. 2, an overview of the eye 150 of FIG. 1 is illustrated in the environment of the operating room 110 positioned below a microscope 200 for the surgery. In this view, lighting conditions of the room 110 in the context of an eye surgery that is about to commence may be better illustrated. For example, the surgeon may orient things by looking through eye pieces 210, 220 with a sightline directed through a reduction lens 230 and a wide-angle lens 250. In this way, particular focus is drawn to interior features of the eye 150 such as the optic nerve 260 and retina 275. So, for example, visibility for removal of vitreous humor from an adjacent region 280 may be facilitated as discussed further below.

However, when attempting to advance surgical instruments to such a region 280, visibility at the front of the eye 150 in the initial environment of the room 110 may not automatically be ideal. This may be of importance given the delicate nature of the cornea 190 and lens 180 in particular. Thus, as noted above, added measures may be taken to help ensure that other aspects near the front of the eye 150 are provided with visibility. As illustrated in FIG. 2, fluorescent light 125 is emitted from the cannulas 130, 115. Therefore, the room 110 may be kept at a relatively dim level to provide contrast and visibility to features at the interior and back of the eye 150 as described while also allowing for cannula visibility near the front. With added reference to FIGS. 1 and 3, the same is true for the ends of instruments approaching the cannulas 130, 115 at the front of the eye 150. Specifically, tailored light 100 renders both a needle 175 of a vitrectomy probe 101 and the end of a light instrument 375 visible to the surgeon near the front of the eye 150. In other words, sufficiently illuminated tool ends and cannulas 130, 115 are visible to the surgeon in spite of the otherwise dim conditions of the room 110.

Referring now to FIG. 3, a perspective view of the surgical tool 101 of FIG. 1 is shown in the form of a vitrectomy probe. However, in addition to the probe 101, a light instrument 375 is also shown which is utilized to direct the tailored window of light 100 toward the probe 101. More specifically, a light emitting diode (LED) 355 or other light source of the instrument is utilized to direct the light 100 at the needle 175 of the probe 101 near a port 377 discussed further below. That is, the probe 101 includes a variety of other features at other locations, such as a tapered handle 350, housing 360 and/or removable shell 325. However, it is the end of the needle 175 that is of visibility concern when it comes to pairing and threading of the probe 101 relative the cannula 115 and into the eye 150 as illustrated in FIG. 4. In this regard, the light 100 may be of a tailored window of full spectrum, low illumination or of a substantially monochromatic nature as described hereinabove.

Continuing with reference to FIG. 2, it is worth noting that the tailored window of light 100 may include light that is outside of the visible spectrum in terms of the surgeon's own naked eye, for example. That is, in certain circumstances, visibility for the surgeon is provided indirectly by way of a video screen. Thus, light that is visible to video instrumentation, even if not visible to the surgeon may be sufficient. By way of a specific example, substantially monochromatic light that is below about 400 nm in wavelength may be outside of the surgeon's own visible spectrum and nevertheless sufficient for generating decipherable imaging by way of a video screen presented to the surgeon.

In some embodiments, the light provided by the instrument 375 may be switched between the tailored light 100 and a light preferred for illumination of the interior of the eye. For example, the surgeon may switch the instrument 375 to the tailored light while the light is outside of the eye and then switch the instrument provided light to a brighter (or dimmer) light for illuminating the interior of the eye once the instrument 375 has been inserted into the eye (e.g., through cannulas 130, 115). In some embodiments, other characteristics of the light may also be changed after the light is inserted into the eye (e.g., independent levels of red, green, and blue LEDs providing the light may be adjusted). In some embodiments, blue light may be omitted entirely once the instrument 375 is inserted into the eye.

Input to trigger switching between the tailored light and internal eye light may be provided by the surgeon, for example, through pressing a button on a foot pedal, pressing a button on a surgical console, pressing a button on the side of the instrument 375, etc.) In some embodiments, the instrument 375 may include an optical sensor near an end of the probe that provides detected light levels to a surgical console to assist the console in determining if the instrument 375 is inside or outside of the eye (and the tailored light may be switched on (out of the eye) or off (inside the eye in which case a different type of light may be emitted), accordingly. Other detection means are also contemplated (e.g., the console may analyze images of the surgical site taken through a camera to determine if the instrument 375 is inside or outside the eye and switch the light accordingly).

In some embodiments, the tailored light may be emitted from, for example, a microscope part that is not configured to enter the eye. In this case, the console may determine when a surgical implement (e.g., a vitrectomy probe) is outside of the eye (e.g., using an optical sensor on the vitrectomy probe or analyzing images of the surgical site to determine a location of the vitrectomy probe) and emit a tailored light from the microscope part. Further, when the console determines (through, for example, the optical sensor or image analysis, etc.) that the vitrectomy probe is inside the eye (e.g., inserted through cannulas 115, 130) the console may switch the light emitted from the microscope part to light with different characteristics (e.g., intensity, frequency, etc.) according to, for example, a surgeon preference for the light once the vitrectomy probe is located in the eye.

Referring now to FIG. 4, a perspective overview of the tool 101 and light instrument 375 of FIG. 3 are shown advanced to within the eye 150 of FIGS. 1 and 2 for a surgical procedure therein. During the procedure, the needle 175 is inserted through a preplaced cannula 130 and directed toward a region 280 where vitreous humor is to be removed. Specifically, a suction is applied and the port 177 is used for the uptake of the vitreous humor or other substances. For example, in the procedure illustrated, a hemorrhage may be taking place in the region 280 such that blood is drawn into the port 177 along with the vitreous humor. Regardless, of the particulars of the procedure itself, however, the visibility of the ends of the tool 101 and instrument 375 is enhanced by a uniquely tailored window of light 100 that does not compromise the given light of the room 110 (see FIG. 1). Thus, these devices (101, 375) may reach the depicted destination without sacrifice to visibility and potential harm to portions of the eye 150 at its front. Once more, this same light 100 may be used to further aid visibility in performing the surgery as illustrated in FIG. 4. However, in an alternate embodiment, the light 100 may emerge from another source such as the microscope 200 of FIG. 2. In this way, the surgeon may control a foot pedal, utilize voice activation, a wearable sensor or other means of light actuation, thereby freeing up another hand during the surgical procedure.

As indicated, the surgery includes the probe 101 and a light instrument 375 reaching into the eye 150 through cannulas 115, 130 positioned in an offset manner at the sclera 170. In this way, the more delicate cornea 190 and lens 180 may be avoided. By the same token, the optic nerve 560 and retina 575 are also quite delicate. Therefore, given that the needle 175 is capable of reaching these delicate features, illuminating both the back of the eye 150 and the end of the needle 175 for the surgeon are of significant benefit. Once more, the manner in which this is achieved for the embodiments herein, do not require the surgeon to pause for any eye adjustment for sake of his/her own visibility.

Figure 5:
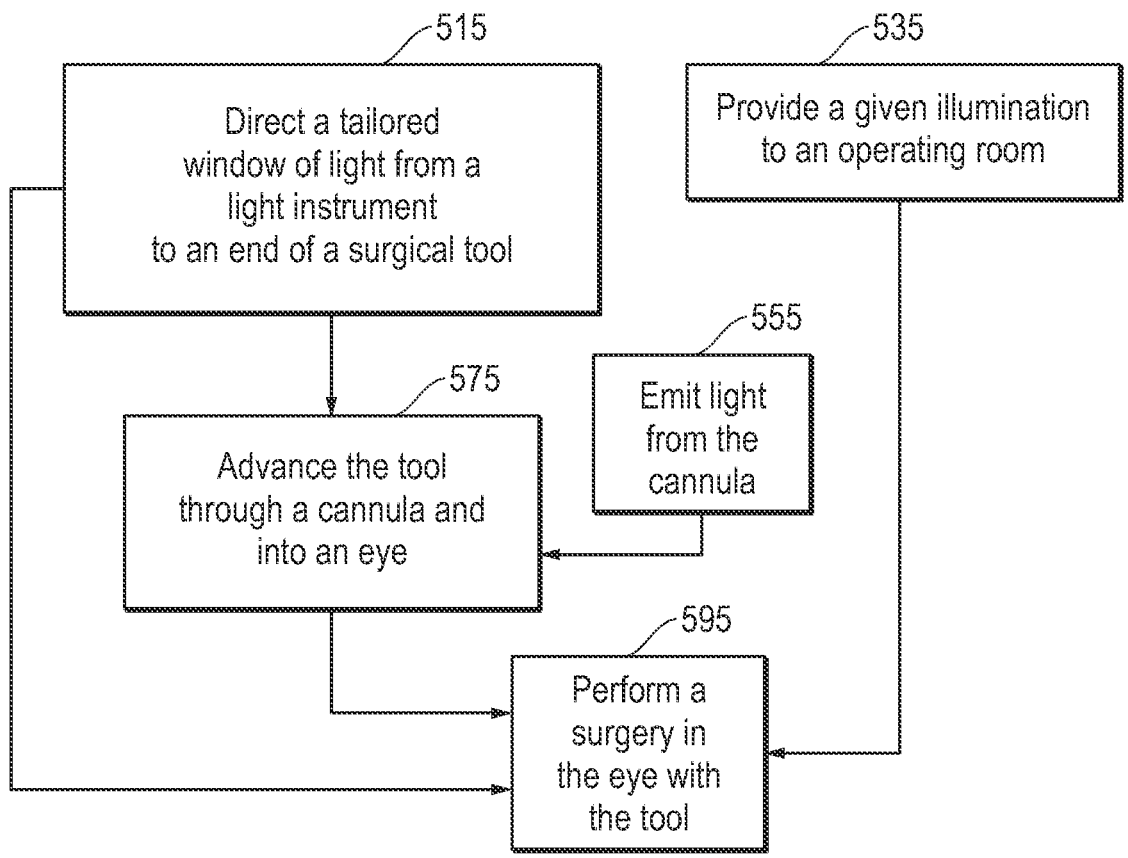
FIG. 5 is a flow-chart summarizing an embodiment of utilizing a tailored window of light to visually guide the end of a surgical tool into an eye of a patient.

Referring now to FIG. 5, a flow-chart summarizing an embodiment of utilizing a tailored window of light to visually guide the end of a surgical tool into an eye of a patient is shown. Specifically, with a given light of the operating room set to highlight and contrast visibility at the interior of a patient's eye as indicated at 535, another tailored window of light is directed at the end of a surgical tool (see 515). This tool is then advanced through a cannula and into the eye as indicated at 575. At this same time, light may also be emitted from the cannula itself as noted at 555. Thus, visibility is provided at the front of the eye for the tool and optionally the cannula as well. This occurs without needing to alter the given light of the operating room. Therefore, as indicated at 595, surgery may be performed with the tool reaching into the eye and without the surgeon needing to break for sake of his/her own eyes to re-adjust. Indeed, this surgery may even be further facilitated by the light instrument that supplied the tailored light, now being supplied within the eye. All the while, the desired given light of the operating room environment may be maintained for sake of visibility of the interior of the eye (see 535).

Embodiments described hereinabove include techniques for performing eye surgery with an instrument advanced into an eye in a manner that does not present dramatic changes in light conditions. That is, there is no need to dramatically increase illumination, whether throughout the operating room or at a more central microscope location. Thus, the surgeon's own eyes are not presented with conditions that require any significant adjustment period between the time the instrument enters the eye and before the procedure commences within the eye. Rather, uniquely tailored windows of light that do not present cause for such adjustment periods are utilized to aid the surgeon in "threading the needle" that is guidance into a preplaced cannula at the eye for the procedure. As a result, the surgeon need not spend an inordinate amount of time remaining calm and still while holding a surgical tool within a patient's eye and waiting for a return to normal vision.

The preceding description has been presented with reference to presently preferred embodiments. However, other embodiments and/or features of the embodiments disclosed but not detailed hereinabove may be employed. Furthermore, persons skilled in the art and technology to which these embodiments pertain will appreciate that still other alterations and changes in the described structures and methods of operation may be practiced without meaningfully departing from the principle and scope of these embodiments. Additionally, the foregoing description should not be read as pertaining only to the precise structures described and shown in the accompanying drawings, but rather should be read as consistent with and as support for the following claims, which are to have their fullest and fairest scope.

The invention claimed is:

1. A method of performing an eye surgery in a room, the performing comprising:
   securing a cannula near a front of an eye;
   maintaining a given light intensity in the room to enhance contrast at an interior of the eye for a surgeon during the surgery;
   advancing an end of a surgical tool toward the cannula for guidance into the eye;
   directing a tailored window of light different from the given light toward the end of the surgical tool during the advancing to enhance visibility thereof, wherein the tailored window of light has a first light parameter value; and
   changing the light to a different light when the surgical tool has been inserted into the eye, wherein the different light has a second light parameter value that is different from the first light parameter value.

2. The method of claim 1 further comprising emitting fluorescent light from the cannula during the advancing of the the end of the surgical tool.

3. The method of claim 1 further comprising:
   utilizing a light instrument for the directing of the tailored window of light;
   advancing a light source of the instrument into the eye; and
   performing a surgical procedure with the end of the surgical tool.

4. The method of claim 1 wherein the tailored window of light is selected from a group consisting of light that is between about 5% and about 30% illumination and light that is substantially monochromatic.

5. The method of claim 1 wherein the tailored window of light is substantially monochromatic light is under about 3,000 nm.

6. The method of claim 5 wherein the monochromatic light is one of amber, near IR and IR.

7. The method of claim 1, wherein the first light parameter value is a brightness value and wherein the second light parameter value is a brightness value that is brighter than the first light parameter value.

8. The method of claim 1, wherein the first light parameter value is an independent level of a red, green, or blue light emitting diode (LED) value and wherein the second light parameter value is an independent level of a red, green, or blue LED that is different than the first light parameter value.

9. The method of claim 1, wherein changing the light to a different light comprises receiving an input from a user indicating the light has been inserted into the eye and changing the light to the different light upon receiving the input.

10. The method of claim 1, further comprising receiving an optical sensor value indicating the light has been inserted into the eye and wherein changing the light comprises automatically changing the light to the different light when the optical sensor value indicates the light has been inserted into the eye.

11. The method of claim 1, further comprising analyzing an image of a surgical site to determine when the light has been inserted into the eye and wherein changing the light comprises automatically changing the light to the different light upon determining the light has been inserted into the eye.

12. The method of claim 1, wherein the tailored window of light is below 400 nanometers in wavelength such that the tailored window of light is not visible to a user's eyes but is visible to video instrumentation to be used to generate a decipherable image on a video screen presented to the user of the surgical tool.

13. A method of performing an eye surgery in a room of a given light for enhanced visual contrast of an interior of an eye, the performing comprising:
   advancing an end of a surgical tool toward a front of the eye;
   directing a tailored window of light different from the given light toward the end of the surgical tool near the front of the eye during the advancing to enhance visibility thereof, wherein the tailored window of light has a first light parameter value; and
   changing the light to a different light when the surgical tool has been inserted into the eye, wherein the different light has a second light parameter value that is different from the first light parameter value.

14. The method of claim 13 wherein the tailored window of light is light outside of a visible spectrum of light to a surgeon performing the surgery.

15. The method of claim 13 further comprising generating an image of the end of the surgical tool for display at a screen visible to a surgeon performing the surgery.

16. The method of claim 13, wherein the first light parameter value is a brightness value and wherein the second light parameter value is a brightness value that is brighter than the first light parameter value.

17. The method of claim 13, wherein the first light parameter value is an independent level of a red, green, or blue light emitting diode (LED) value and wherein the second light parameter value is an independent level of a red, green, or blue LED that is different than the first light parameter value.

18. The method of claim 13, wherein changing the light to a different light comprises receiving an input from a user indicating the light has been inserted into the eye and changing the light to the different light upon receiving the input.

19. The method of claim 13, further comprising receiving an optical sensor value indicating the light has been inserted into the eye and wherein changing the light comprises automatically changing the light to the different light when the optical sensor value indicates the light has been inserted into the eye.

20. The method of claim 13, further comprising analyzing an image of a surgical site to determine when the light has been inserted into the eye and wherein changing the light comprises automatically changing the light to the different light upon determining the light has been inserted into the eye.

* * * * *